(12) United States Patent
Sharp et al.

(10) Patent No.: US 12,287,812 B2
(45) Date of Patent: Apr. 29, 2025

(54) ENRICHING SEARCH RESULTS WITH PROVENANCE INFORMATION IN AN OBSERVABILITY PIPELINE SYSTEM

(71) Applicant: Cribl, Inc., San Francisco, CA (US)

(72) Inventors: Clint Sharp, Oakland, CA (US); Dritan Bitincka, Edgewater, NJ (US); Ledion Bitincka, San Francisco, CA (US); Oliver Draese, Los Gatos, CA (US)

(73) Assignee: Cribl, Inc., San Francisco, CA (US)

(*) Notice: Subject to any disclaimer, the term of this patent is extended or adjusted under 35 U.S.C. 154(b) by 0 days.

(21) Appl. No.: 18/322,048

(22) Filed: May 23, 2023

(65) Prior Publication Data
US 2023/0376498 A1    Nov. 23, 2023

Related U.S. Application Data

(60) Provisional application No. 63/344,864, filed on May 23, 2022, provisional application No. 63/414,762, (Continued)

(51) Int. Cl.
*G06F 7/00* (2006.01)
*G06F 11/34* (2006.01)
(Continued)

(52) U.S. Cl.
CPC ........ *G06F 16/287* (2019.01); *G06F 11/3419* (2013.01); *G06F 16/2453* (2019.01);
(Continued)

(58) Field of Classification Search
CPC ............... G06F 16/287; G06F 16/2471; G06F 16/2453; G06F 16/2457; G06F 16/248;
(Continued)

(56) References Cited

U.S. PATENT DOCUMENTS 7,412,442 B1 * 8/2008 Vadon ................. G06F 16/3325
707/999.005
8,285,725 B2   10/2012 Bayliss
(Continued)

FOREIGN PATENT DOCUMENTS

WO    2023230001    11/2023
WO    2023230005    11/2023
(Continued)

OTHER PUBLICATIONS

WIPO, International Search Report and Written Opinion issued in Application No. PCT/US2023/023214 on Aug. 22, 2023, 12 pages.
(Continued)

*Primary Examiner* — Mohammad A Sana
(74) *Attorney, Agent, or Firm* — Young Basile Hanlon & MacFarlane, P.C.

(57) ABSTRACT

In some aspects, search functionality is provided in an observability pipeline system. In some implementations, a search method includes receiving a search query from a leader role in an observability pipeline system. The search query represents a request to search event data at a computer resource. An observability pipeline process is configured to perform a search according to the search query, and search results are obtained based on applying the observability pipeline process to the event data. The search results include events from the event data. Provenance information is obtained for each of the events. The provenance information for each event includes an identification of the computer resource and a link to the computer resource. Augmented search results are generated by associating the provenance information with the respective events, and the augmented search results are communicated to the leader role.

20 Claims, 6 Drawing Sheets

Related U.S. Application Data filed on Oct. 10, 2022, provisional application No. 63/419,632, filed on Oct. 26, 2022, provisional application No. 63/423,264, filed on Nov. 7, 2022.

(51) Int. Cl.

| | | |
|---|---|---|
| *G06F 16/2453* | (2019.01) | |
| *G06F 16/2457* | (2019.01) | |
| *G06F 16/2458* | (2019.01) | |
| *G06F 16/248* | (2019.01) | |
| *G06F 16/28* | (2019.01) | |
| *H04L 67/1021* | (2022.01) | |

(52) U.S. Cl.
CPC ...... *G06F 16/2457* (2019.01); *G06F 16/2471* (2019.01); *G06F 16/248* (2019.01); *H04L 67/1021* (2013.01)

(58) Field of Classification Search
CPC ............... G06F 16/338; G06F 16/9038; G06F 16/9535; G06F 16/1734; G06F 16/86; G06F 16/29; G06F 2201/86; G06F 11/3419; G06F 11/3072
See application file for complete search history.

(56) References Cited

U.S. PATENT DOCUMENTS

| | | | |
|---|---|---|---|
| 8,751,529 | B2 | 6/2014 | Zhang et al. |
| 8,806,361 | B1 | 8/2014 | Noel et al. |
| 8,837,360 | B1 | 9/2014 | Mishra et al. |
| 9,124,612 | B2 | 9/2015 | Vasan et al. |
| 9,130,971 | B2 | 9/2015 | Vasan et al. |
| 9,921,733 | B2 | 3/2018 | Filippi et al. |
| 10,235,460 | B2 | 3/2019 | Ago et al. |
| 10,394,802 | B1 | 8/2019 | Porath et al. |
| 10,599,724 | B2 | 3/2020 | Pal et al. |
| 10,776,355 | B1 | 9/2020 | Batsakis et al. |
| 10,929,415 | B1 | 2/2021 | Shcherbakov |
| 10,984,044 | B1 | 4/2021 | Batsakis et al. |
| 11,003,682 | B2 | 5/2021 | Porath et al. |
| 11,003,714 | B1 | 5/2021 | Batsakis et al. |
| 11,120,344 | B2 | 9/2021 | Das et al. |
| 11,216,453 | B2 | 1/2022 | Papale et al. |
| 11,216,511 | B1 | 1/2022 | Bigdelu et al. |
| 11,250,056 | B1 | 2/2022 | Batsakis et al. |
| 11,263,268 | B1 | 3/2022 | Bourbie et al. |
| 11,269,476 | B2 | 3/2022 | Noel et al. |
| 11,269,871 | B1 | 3/2022 | Bigdelu et al. |
| 11,281,706 | B2 | 3/2022 | Pal et al. |
| 11,416,563 | B1 | 8/2022 | Spagnolo |
| 11,422,686 | B2 | 8/2022 | Filippi et al. |
| 11,636,128 | B1* | 4/2023 | Bigdelu .............. G06F 16/2428 707/722 |
| 2004/0078367 | A1 | 4/2004 | Anderson et al. |
| 2006/0248073 | A1 | 11/2006 | Jones et al. |
| 2008/0059899 | A1 | 3/2008 | Gemmell et al. |
| 2008/0263025 | A1* | 10/2008 | Koran .................. G06F 16/9537 707/999.005 |
| 2008/0270391 | A1 | 10/2008 | Newbold et al. |
| 2008/0301106 | A1 | 12/2008 | Oral et al. |
| 2009/0198596 | A1* | 8/2009 | Dolan .................... G06Q 10/06 705/28 |
| 2010/0322255 | A1 | 12/2010 | Hao et al. |
| 2012/0317087 | A1 | 12/2012 | Lymberopoulos et al. |
| 2013/0138638 | A1 | 5/2013 | Karenos et al. |
| 2014/0059120 | A1 | 2/2014 | Richardson et al. |
| 2015/0032728 | A1 | 1/2015 | Rozich et al. |
| 2015/0242416 | A1* | 8/2015 | Nakano ............... G06F 11/3048 707/694 |
| 2016/0226731 | A1 | 8/2016 | Maroulis |
| 2017/0075990 | A1 | 3/2017 | Leu |
| 2018/0082410 | A1 | 3/2018 | Schulte |
| 2018/0232465 | A1 | 8/2018 | Yonekawa et al. |
| 2019/0130003 | A1 | 5/2019 | Maiti et al. |
| 2020/0012638 | A1 | 1/2020 | Luo |
| 2020/0097481 | A1 | 3/2020 | Cosentino et al. |
| 2020/0257680 | A1 | 8/2020 | Danyi et al. |
| 2021/0117425 | A1 | 4/2021 | Rao et al. |
| 2021/0133650 | A1 | 5/2021 | Cella et al. |
| 2021/0279265 | A1 | 9/2021 | Stevens |
| 2021/0287156 | A1 | 9/2021 | Rogynskyy et al. |
| 2021/0382964 | A1 | 12/2021 | Moore et al. |
| 2022/0147000 | A1 | 5/2022 | Cooley et al. |
| 2022/0191148 | A1 | 6/2022 | Raindel |
| 2023/0041129 | A1 | 2/2023 | Terlecki et al. |
| 2023/0095756 | A1 | 3/2023 | Wilkinson et al. |
| 2023/0350931 | A1 | 11/2023 | Lewis et al. |
| 2023/0376483 | A1 | 11/2023 | Sharp et al. |
| 2023/0376491 | A1 | 11/2023 | Sharp et al. |
| 2023/0376509 | A1 | 11/2023 | Sharp et al. |

FOREIGN PATENT DOCUMENTS

| | | |
|---|---|---|
| WO | 2023230047 | 11/2023 |
| WO | 2023230048 | 11/2023 |

OTHER PUBLICATIONS

WIPO, International Search Report and Written Opinion issued in Application No. PCT/US2023/023213 on Aug. 22, 2023, 13 pages.
WIPO, International Search Report and Written Opinion issued in Application No. PCT/US2023/023118 on Aug. 22, 2023, 9 pages.
WIPO, International Search Report and Written Opinion issued in Application No. PCT/US2023/023123 on Aug. 22, 2023, 9 pages.
USPTO, Non-Final Office Action issued in U.S. Appl. No. 18/321,189 on May 10, 2024, 49 pages.
USPTO, Non-Final Office Action issued in U.S. Appl. No. 18/321,267 on Jul. 1, 2024, 59 pages.
USPTO, Non-Final Office Action issued in U.S. Appl. No. 18/322,054 on Sep. 30, 2024, 51 pages.

* cited by examiner

ENRICHING SEARCH RESULTS WITH PROVENANCE INFORMATION IN AN OBSERVABILITY PIPELINE SYSTEM

CROSS-REFERENCE TO RELATED APPLICATIONS

This application claims priority to U.S. Provisional Patent Application No. 63/344,864, filed May 23, 2022, entitled "Observability Platform Search;" U.S. Provisional Patent Application No. 63/414,762, filed Oct. 10, 2022, entitled "Observability Platform Search;" U.S. Provisional Patent Application No. 63/419,632, filed Oct. 26, 2022, entitled "Observability Platform Search;" and U.S. Provisional Application No. 63/423,264, filed Nov. 7, 2022, entitled "Observability Platform Search." Each of the above-referenced priority documents is incorporated herein by reference.

BACKGROUND

The following description relates to automatically enriching search results with provenance information in an observability pipeline system.

Observability pipelines are used to search, route and process data in a number of contexts. For example, observability pipelines can provide unified routing of various types of machine data to multiple destinations while adapting data shapes and controlling data volumes. In some implementations, observability pipelines allow an organization to interrogate machine data from its environment without knowing in advance the questions that will be asked. Observability pipelines may also provide monitoring and alerting functions, which allow systematic observation of data for known conditions that require specific action or attention.

DETAILED DESCRIPTION

Figure 1:
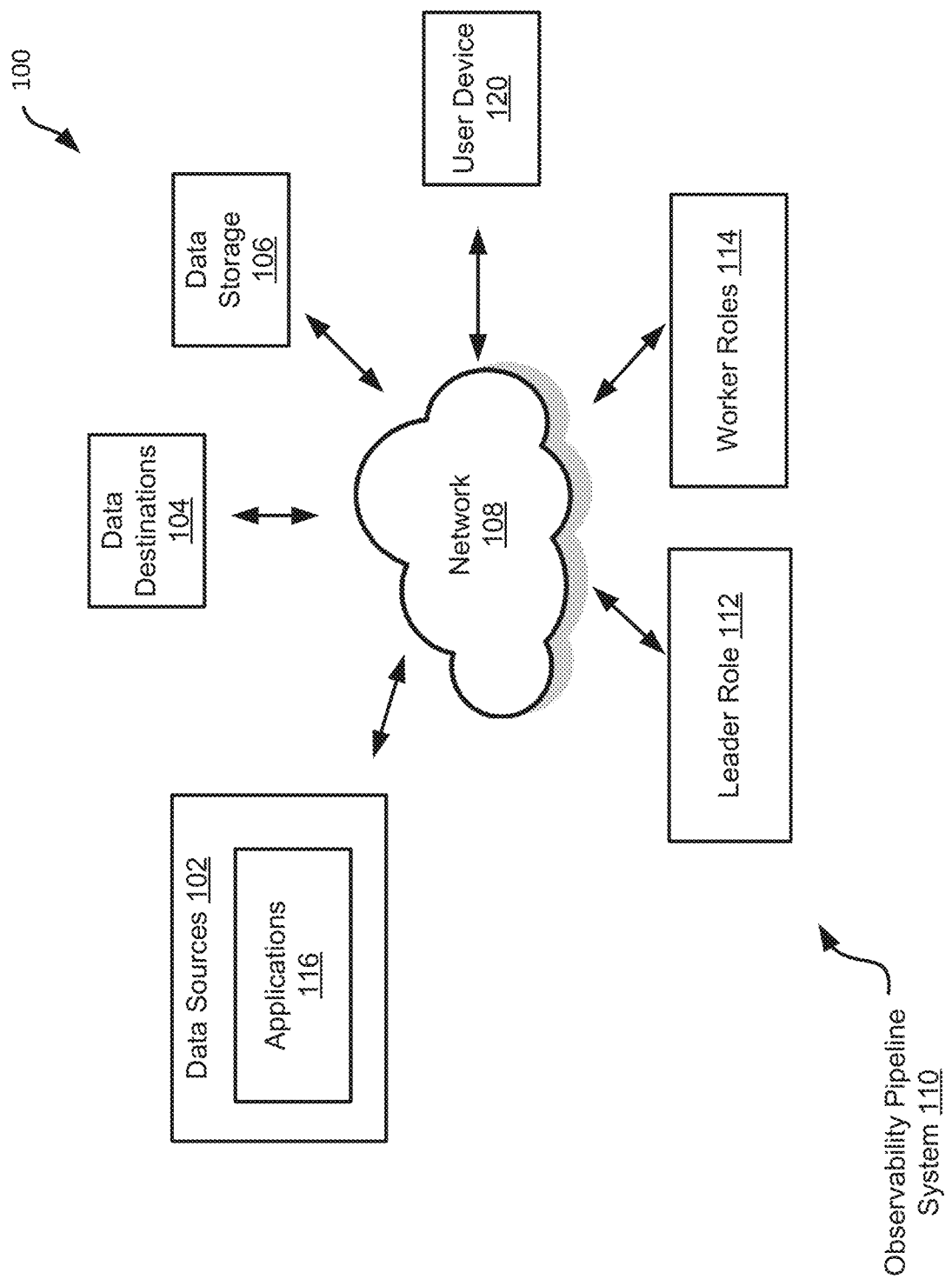
FIG. 1 is a block diagram showing aspects of an example computing environment that includes an observability pipeline system.

In some implementations, search functionality is configured to execute search queries on event data stored on an endpoint node, a remote data storage node, or other computer resources. In some instances, search functionality can be performed by configuring and applying an observability pipeline process (e.g., the observability pipeline process 200 in FIG. 2) to the event data. In some implementations, search functionality can enable personnel (e.g., administrators, users, etc.) with a single search tool to query event data without having to re-collect the event data. In some implementations, search functionality can be performed on data at rest, already collected and stored. For example, when event data is already in S3 (or similar) or even collected in a system of analysis, like Splunk, Elastic, etc., in an organization's observability lake or even within existing systems, such event data can also be queried. In some instances, the event data to be queried can include structured, semi-structured, and unstructured data. The search functionality can be performed based on any terms, patterns, value/pairs, and any data type. In some implementations, the search functionality can vastly increase the scope of analysis without requiring the cost or complexity of first shipping, ingesting, and storing the data. In some implementations, search functionality is not restricted to a single location, a single bucket, or a single vendor platform for the data.

The systems and techniques described here can provide technical advantages and improvements over existing technologies. As an example, search functionality provided in an observability pipeline system can allow enterprise computer systems to extract value from observability pipeline systems more efficiently while conserving computing resources. This can improve accessibility to data in lakes, S3, the edge, etc. Search functionality may require minimal setup to use and no extra infrastructure. In some cases, the S3 data set provider can connect to S3 buckets by assuming an AWS role with read permissions, allowing the search of AWS service logs or any data stored in S3 without needing to index or move all the data. Search functionality can quickly scale to provide ephemeral on-demand compute to handle large search jobs and scale back once complete. Search language may be based on Kusto Query Language or another query language or dialect.

In some implementations, search results obtained based on applying the observability pipeline process according to the search query includes respective events. The search results can be enriched by associating provenance information with the respective events, prior to being communicated back to a leader role of an observability pipeline system. Provenance information of a respective event may include an identification of the computer resource at which the event is stored and a link to the computer resource storing the event. In some instances, provenance information may include other metadata and login information to allow a user device to initiate a session on the computer resource. For example, the provenance information may include one or more of the following: protocol credentials, authentication, schema to read the file, compression encoding, permissions, etc. The provenance information allows the user to access the computer resource storing the event.

Enriching events with provenance information by providing links to the computer resource has numerous benefits. For example, the provenance information may enhance the transparency and trustworthiness of the data, as users can easily trace the source of the information and evaluate its reliability. As another example, the provenance information may facilitate collaboration and knowledge sharing, as users can easily share and access the same data sources. In some cases, the provenance information improves the efficiency and accuracy of data analysis, by allowing for easier identification and resolution of any data quality issues. Additionally, enhancing events with provenance information can help meet regulatory and compliance requirements by ensuring that data is properly sourced and tracked.

In some implementations, the techniques described here provide more detailed and relevant information about the search results; enriched search results can provide direct links and authentication to access the data source; enriched search results can also provide additional context and insight to the search results; can enhance user experience; or provide a combination of these and other advantages. In some implementations, provenance information can be shared among users to improve efficiency and accuracy of data analysis, allow easier identification and resolution of data quality issues, enable proper sourced and tracked data and thus enhance data transparency. Accordingly, aspects of the systems and techniques described here can be used to improve the operation of computer systems, information and data management systems, observability pipeline systems, and other classes of technology.

FIG. 1 is a block diagram showing aspects of an example computing environment 100 that includes an observability pipeline system 110. In addition to the observability pipeline system 110, the example computing environment 100 shown in FIG. 1 includes data sources 102, data destinations 104, data storage 106, network 108, and a user device 120. The data sources 102 includes an application 116 which is configured to produce source data. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization or another type of entity or group of entities. During operation, various data sources 102 in an organization's computing infrastructure produce volumes of machine data that contain valuable or useful information. These data sources can include applications 116 and other types of computer resources. The machine data may include data generated by the organization itself, data received from external entities, or a combination. By way of example, the machine data can include network packet data, sensor data, application program data, observability data, and other types of data. Observability data can include, for example, system logs, error logs, stack traces, system performance data, or any other data that provides information about computing infrastructure and applications (e.g., performance data and diagnostic information). The observability pipeline system 110 can receive and process the machine data generated by the data sources 102. For example, the machine data can be processed to diagnose performance problems, monitor user interactions, and to derive other insights about the computing environment 100. Generally, the machine data generated by the data sources 102 does not have to use a common format or structure, and the observability pipeline system 110 can generate structured output data having a specified form, format, or type. The output generated by the observability pipeline system can be delivered to data destinations 104, data storage 106, or both. In some cases, the data delivered to the data storage 106 includes the original machine data that was generated by the data sources 102, and the observability pipeline system 110 can later retrieve and process the machine data that was stored on the data storage 106.

In general, the observability pipeline system 110 can provide several services for processing and structuring machine data for an enterprise or other organization. In some instances, the observability pipeline system 110 provides schema-agnostic processing, which can include, for example, enriching, aggregating, sampling, suppressing, or dropping fields from nested structures, raw logs, and other types of machine data. The observability pipeline system 110 may also function as a universal adapter for any type of machine data destination. For example, the observability pipeline system 110 may be configured to normalize, denormalize, and adapt schemas for routing data to multiple destinations. The observability pipeline system 110 may also provide protocol support, allowing enterprises to work with existing data collectors, shippers, and agents, and providing simple protocols for new data collectors. In some cases, the observability pipeline system 110 can test and validate new configurations and reproduce how machine data was processed. The observability pipeline system 110 may also have responsive configurability, including rapid reconfiguration to selectively allow more verbosity with pushdown to data destinations or collectors. The observability pipeline system 110 may also provide reliable delivery (e.g., at least once delivery semantics) to ensure data integrity.

The data sources 102, data destinations 104, data storage 106, observability pipeline system 110, and the user device 120 are each implemented by one or more computer systems that have computational resources (e.g., hardware, software, firmware) that are used to communicate with each other and to perform other operations. For example, each computer system may be implemented as in the example computer system 500 shown in FIG. 5 or components thereof. In some implementations, computer systems in the computing environment 100 can be implemented in various types of devices, such as, for example, laptops, desktops, workstations, smartphones, tablets, sensors, routers, mobile devices, Internet of Things (IoT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The data sources 102, data destinations 104, data storage 106, observability pipeline system 110, and the user device 120 and possibly other computer systems or devices communicate with each other over the network 108. The example network 108 can include all or part of a data communication network or another type of communication link. For example, the network 108 can include one or more wired or wireless connections, one or more wired or wireless networks, or other communication channels. In some examples, the network 108 includes a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The data sources 102 can include multiple user devices, servers, sensors, routers, firewalls, switches, virtual machines, containers, or a combination of these and other types of computer devices or computing infrastructure components. The data sources 102 detect, monitor, create, or otherwise produce machine data during their operation. The machine data is provided to the observability pipeline system 110 through the network 108. In some cases, the machine data is streamed to the observability pipeline system 110 as pipeline input data.

The data sources 102 can include data sources designated as push sources (examples include Splunk TCP, Splunk HEC, Syslog, Elasticsearch API, TCP JSON, TCP Raw, HTTP/S, Raw HTTP/S, Kinesis Firehose, SNMP Trap, Metrics, and others), pull sources (examples include Kafka, Kinesis Streams, SQS, S3, Google Cloud Pub/Sub, Azure Blob Storage, Azure Event Hubs, Office 365 Services, Office 365 Activity, Office 365 Message Trace, Prometheus, and others), and other types of data sources. The data sources 102 can also include other applications 116.

In the example shown in FIG. 1, the application 116 includes a collection of computer instructions that constitute a computer program. The computer instructions reside in memory and execute on a processor. The computer instructions can be compiled or interpreted. An application 116 can be contained in a single module or can be statically or dynamically linked with other libraries. The libraries can be provided by the operating system or the application provider.

The data destinations 104 can include multiple user devices, servers, databases, analytics systems, data storage systems, or a combination of these and other types of computer systems. The data destinations 104 can include, for example, log analytics platforms, time series databases (TSDBs), distributed tracing systems, security information and event management (SIEM) or user behavior analytics (UBA) systems, and event streaming systems or data lakes (e.g., a system or repository of data stored in its natural/raw format). The pipeline output data produced by the observability pipeline system 110 can be communicated to the data destinations 104 through the network 108.

The data storage 106 can include multiple user devices, servers, databases, hosted services, or a combination of these and other types of data storage systems. Generally, the data storage 106 can operate as a data source or a data destination (or both) for the observability pipeline system 110. In some examples, the data storage 106 includes a local or remote filesystem location, a network file system (NFS), Amazon S3 buckets, S3-compatible stores, other cloud-based data storage systems, enterprise databases, systems that provide access to data through REST API calls or custom scripts, or a combination of these and other data storage systems. The pipeline output data, which may include the machine data from the data sources 102 as well as data analytics and other output from the observability pipeline system 110, can be communicated to the data storage 106 through the network 108.

The observability pipeline system 110 may be used to monitor, track, and triage events by processing the machine data from the data sources 102. The observability pipeline system 110 can receive an event data stream from each of the data sources 102 and identify the event data stream as pipeline input data to be processed by the observability pipeline system 110. The observability pipeline system 110 generates pipeline output data by applying observability pipeline processes to the pipeline input data and communicates the pipeline output data to the data destinations 104. In some implementations, the observability pipeline system 110 operates as a buffer between data sources and data destinations, such that all data sources send their data to the observability pipeline system 110, which handles filtering and routing the data to proper data destinations.

In some implementations, the observability pipeline system 110 unifies data processing and collection across many types of machine data (e.g., metrics, logs, and traces). The machine data can be processed by the observability pipeline system 110 by enriching it and reducing or eliminating noise and waste. The observability pipeline system 110 may also deliver the processed data to any tool in an enterprise designed to work with observability data. For example, the observability pipeline system 110 may analyze event data and send analytics to multiple data destinations 104, thereby enabling the systematic observation of event data for known conditions that require attention or other action. Consequently, the observability pipeline system 110 can decouple sources of machine data from data destinations and provide a buffer that makes many, diverse types of machine data easily consumable.

In some example implementations, the observability pipeline system 110 can operate on any type of machine data generated by the data sources 102 to properly observe, monitor, and secure the running of an enterprise's infrastructure and applications 116 while minimizing overlap, wasted resources, and cost. Specifically, instead of using different tools for processing different types of machine data, the observability pipeline system 110 can unify data collection and processing for all types of machine data (e.g., logs 204, metrics 206, and traces 208 shown in FIG. 2) and route the processed machine data to multiple data destinations 104. Unifying data collection can minimize or reduce redundant agents with duplicate instrumentation and duplicate collection for the multiple destinations. Unifying processing may allow routing of processed machine data to disparate data destinations 104 while adapting data shapes and controlling data volumes.

In an example, the observability pipeline system 110 obtains DogStatsd metrics, processes the DogStatsd metrics (e.g., by enriching the metrics), sends processed data having high cardinality to a first destination (e.g., Honeycomb), and processed data having low cardinality to a second, different destination (e.g., Datadog). In another example, the observability pipeline system 110 obtains windows event logs, sends full fidelity processed data to a first destination (e.g., an S3 bucket), and sends a subset (e.g., where irrelevant events are removed from the full fidelity processed data) to one or more second, different destinations (e.g., Elastic and Exabeam). In another example, machine data is obtained from a Splunk forwarder and processed (e.g., sampled). The raw processed data may be sent to a first destination (e.g., Splunk). The raw processed data may further be parsed, and structured events may be sent to a second destination (e.g., Snowflake).

The example observability pipeline system 110 shown in FIG. 1 includes a leader role 112 and multiple worker role 114. The leader role 112 leads the overall operation of the observability pipeline system 110 by configuring and monitoring the worker roles 114; the worker roles 114 receive event data streams from the data sources 102 and data storage 106, apply observability pipeline processes to the event data, and deliver pipeline output data to the data destinations 104 and data storage 106.

The observability pipeline system 110 may deploy the leader role 112 and a number of worker roles 114 on a single computer node or on many computer nodes. For example, the leader role 112 and one or more worker roles 114 may be deployed on the same computer node. Or in some cases, the leader role 112 and each worker role 114 may be deployed on distinct computer nodes. The distinct computer nodes can be, for example, distinct computer devices, virtual machines, containers, processors, or other types of computer nodes.

The user device 120, the observability pipeline system 110, or both, can provide a user interface for the observability pipeline system 110. Aspects of the user interface can be rendered on a display (e.g., the display 550 in FIG. 5) or otherwise presented to a user. The user interface may be generated by an observability pipeline application that interacts with the observability pipeline system 110. The observability pipeline application can be deployed as software that includes application programming interfaces (APIs), graphical user interfaces (GUIs), and other modules.

In some implementations, an observability pipeline application can be deployed as a file, executable code, or another type of machine-readable instructions executed on the user device 120. The observability pipeline application, when executed, may render GUIs for display to a user (e.g., on a touchscreen, a monitor, or other graphical interface device), and the user can interact with the observability pipeline application through the GUIs. Certain functionality of the observability pipeline application may be performed on the user device 120 or may invoke the APIs, which can access functionality of the observability pipeline system 110. The observability pipeline application may be rendered and executed within another application (e.g., as a plugin in a web browser), as a standalone application, or otherwise. In some cases, an observability pipeline application may be deployed as an installed application on a workstation, as an "app" on a tablet or smartphone, as a cloud-based application that accesses functionality running on one or more remote servers, or otherwise.

In some implementations, the observability pipeline system 110 is a stand-alone computer system that includes only a single computer node. For instance, the observability pipeline system 110 can be deployed on the user device 120 or another computer device in the computing environment 100. For example, the observability pipeline system 110 can be implemented on a laptop or workstation. The standalone computer system can operate as the leader role 112 and the worker roles 114 and may execute an observability pipeline application that provides a user interface as described above. In some cases, the leader role 112 and each of the worker roles 114 are deployed on distinct hardware components (e.g., distinct processors, distinct cores, distinct virtual machines, etc.) within a single computer device. In such cases, the leader role 112 and each of the worker roles 114 can communicate with each other by exchanging signals within the computer device, through a shared memory, or otherwise.

In some implementations, the observability pipeline system 110 is deployed on a distributed computer system that includes multiple computer nodes. For instance, the observability pipeline system 110 can be deployed on a server cluster, on a cloud-based "serverless" computer system, or another type of distributed computer system. The computer nodes in the distributed computer system may include a leader node operating as the leader role 112 and multiple worker nodes operating as the respective worker roles 114. One or more computer nodes of the distributed computer system (e.g., the leader node) may communicate with the user device 120, for example, through an observability pipeline application that provides a user interface as described above. In some cases, the leader node and each of the worker nodes are distinct computer devices in the computing environment 100. In some cases, the leader node and each of the worker nodes can communicate with each other using TCP/IP protocols or other types of network communication protocols transmitted over a network (e.g., the network 108 shown in FIG. 1) or another type of data connection.

In some implementations, the observability pipeline system 110 is implemented by software installed on private enterprise servers, a private enterprise computing device, or other types of enterprise computing infrastructure (e.g., one or more computer systems owned and operated by corporate entities, government agencies, other types of enterprises). In such implementations, some or all of the data sources 102, data destinations 104, data storage 106, and the user device 120 can be or include the enterprise's own computer resources, and the network 108 can be or include a private data connection (e.g., an enterprise network or VPN). In some cases, the observability pipeline system 110 and the user device 120 (and potentially other elements of the computer environment 100) operate behind a common firewall or other network security system.

In some implementations, the observability pipeline system 110 is implemented by software running on a cloud-based computing system that provides a cloud hosting service. For example, the observability pipeline system 110 may be deployed as a SaaS system running on the cloud-based computing system. For example, the cloud-based computing system may operate through Amazon® Web Service (AWS) Cloud, Microsoft Azure Cloud, Google Cloud, DNA *Nexus*, or another third-party cloud. In such implementations, some or all of the data sources 102, data destinations 104, data storage 106, and the user device 120 can interact with the cloud-based computing system through APIs, and the network 108 can be or include a public data connection (e.g., the Internet). In some cases, the observability pipeline system 110 and the user device 120 (and potentially other elements of the computer environment 100) operate behind different firewalls, and communication between them can be encrypted or otherwise secured by appropriate protocols (e.g., using public key infrastructure or otherwise).

In some implementations, search functionality is available through the cloud-based computing system and is provided by the observability pipeline system 110. In some instances, no additional search agent is required to perform search actions. For search-at-rest (e.g., searching an AWS S3 bucket or another type of cloud-based storage), a search process can automatically launch "executor" processes to perform the search query locally. The search functionality of the observability pipeline system 110 may be performed according to a leader-to-worker node/endpoint node control protocol, or another type of control protocol.

In some implementations, search functionality is bounded by groups to support role-based access control, application of computing resources, and other functions. Search can be specified in a search query. A search source can be defined by one or more datasets, referenced in the search query. In certain instances, the number of search sources can be defined in the search query by the number of datasets or search strings.

In some implementations, operators that are supported by search functionality of the observability pipeline system 110 may include: Cribl—(Default) Custom Cribl operator—Simplifies locating specific events; Search—Locates specific events with specific text strings; Where—Filters events based on a Boolean expressions; Project—Define columns used to display results; Extend—Calculates one or more expressions and assigns the results to fields; Find—Locates specific events; Timestats—Aggregates events by time periods or bins; Extract—Extracts information from a field either via parser or regular expression; Summarize—Produces a table that aggregates the content of the input table; Limit (alias Take)—Defines the number of results to return; and other operators that enable other query capabilities. In some instances, other operators and functions may also be supported by the observability pipeline system 110.

In some implementations, search functionality supports multiple functions, including Cribl, Content, Scalar, Statistical and other function types. In some instances, different functions are available in a search language help tab of the user interface of the search functionality to define syntax, rules and provide examples for all Operators and Functions.

In some instances, search recommendations may be included in the search functionality, e.g., default search settings, sample search queries, etc. The user interface of the search functionality may also include a history tab for displaying previous search queries. In some implementations, the search functionality supports complex search queries that include multiple datasets, terms, Boolean logic, etc. These search terms or expressions can be grouped as a single search string. Wildcards may be supported for query bar terms and datasets.

In some cases, during operation, users can connect through a user interface to the cloud-based computing system. A search window may appear on the user interface of the search functionality as a peer to the observability pipeline system 110. Data to query can be identified, which can be accomplished via datasets in a search query or in another manner. In some contexts, a dataset is an addressable set of data defined in the search query at various locations including endpoint nodes, cloud-based storage (e.g., S3 buckets), etc. Predefined datasets can be included in the search functionality, providing the ability to query state information of the observability pipeline system 110 as well as the filesystem of endpoint nodes. These include dataset definitions for leader nodes, endpoint nodes, filesystems, and S3. In some cases, administrators can define and configure their own datasets. In some implementations, the dataset model includes Name the Dataset—any unique identifier; Apply Dataset Provider-Identify external system (e.g., endpoint node, S3 Bucket, etc.); and Apply Dataset Provider Type—this identifies the schema (e.g., Cribl, Filesystem, S3, etc.).

In some instances, a search bar at the user interface of the search functionality can be configured to identify query values. Search functionality may support all personas, as a result the search query expression can be simple terms or more complex literals, regexes, JavaScript expressions, etc. In some implementations, data to be queried is identified; and one or more datasets are defined. In some implementations, the search bar at the user interface of the search functionality includes "type-ahead" capability for syntax completion and query history. For example, by just typing "Dat.." the look ahead capability can provide a list of available datasets. In some implementations, the search operators are defined. Functions, terms, strings, and other search operators can be defined in a search query and separated by a "|" (pipe).

In certain instances, one or more time ranges for search queries can be defined. The one or more time ranges may include real-time windows-seconds, minutes, hours, days; specific time range, e.g., Mar. 20, 2022: 06:00-06:30; or others. A search process can be performed according to the search query. Discovery data can be returned as part of the search results as line items in table format, charts, or in another manner. The search results can be shaped and discovered data can be aggregated as part of the search query (e.g., Project, Extend, Summarize operators) or afterwards with charting options. In some implemented, different chart types, color palettes, axis settings, legends to manipulate how results are displayed can be selected or defined/configured by the user. In some examples, the number of search results are limited by the search query language, including time range. In certain examples, a number of results returned can also be constrained via the "Limit" operator (e.g., Limit 100 or another number).

In some cases, a search query can specify a location of data to be searched. For example, the search query can indicate or otherwise represent a request to search data stored at a computer resource (e.g., the location of any of the data destinations 104, the location of any data storage 106, etc.). The computer resource can be specified by a name (e.g., "EnterpriseData1", "DataCenter834", etc.), by a geographical location or region (e.g., "Ashburn, VA"; "US East"; "North America"; etc.), by an IP address or other identifier, or the storage location can be specified in another manner. The search query can implicitly or explicitly represent the location to be searched. For instance, the search query may include an explicit indication of a computer resource to be searched (e.g., based on data entered or selected in a user interface), or the computer resource to be searched may be specified implicitly based on the context of the search query (e.g., search history, etc.), the type of data being searched, etc.

In some cases, search functionality may allow users to tune the scope of the search query as wide or narrow by specifying constraints within the search itself. For example, a "wide" query can specify a search for instances of 'error' on any workgroup or fleet (which may include a group of devices, equipment, computers or nodes within a small network); a "narrow" query can specify a search for instances of 'error' on host: xyx, in: Var/log directory; and a search query can be anywhere in between the wide and narrow search queries based on rules.

In some instances, the search functionality can query data from specific third-party vendor platforms. Third-party search functions and the search functionality of the observability pipeline system 110 work independently. Administrators may use search results from the search functionality of the observability pipeline system 110 to apply additional configurations to their existing systems and/or configure. The observability pipeline system 110 can forward discovered data or other search results to the third-party systems or platforms. When accessing external data stores (e.g., AWS S3), the search functionality can define authentication rights when the specific dataset is defined.

In some implementations, a search query generated by a user device is received by an agent of the observability pipeline system 110 (e.g., the leader role 112). The observability pipeline system 110 can identify one or more data sources 102 according to the search query. The search query is then dispatched via the network 108. In some instances, a data source may be an endpoint node which includes a search engine as part of the observability pipeline system 110. In this case, the leader role 112 may initiate the search engine to perform the search by applying an observability pipeline process. For instance, the search engine may inspect the data source, identify processes running on the data source; explore and discover log files according to the search query; generate observability pipeline output data; augment the observability pipeline output data with metadata obtained from the data source; and route the augmented observability pipeline output data to a data destination (e.g., a cloud-based centralized node, a user device, a data storage, the leader role 112 or the worker roles 114 of the observability pipeline system 110).

In some instances, the observability pipeline system 110 can identify one or more data storage systems 106 according to the search query. A data storage 106 may be accessed via a host node. In this case, the leader role 112 of the observability pipeline system 110 can dispatch a search query to the host node, which includes a search engine that can perform the search by applying an observability pipeline process. For instance, the search engine can read data from the data storage 106, apply the observability pipeline processes to the event data produce search results; obtain metadata from the respective data storage 106; augment the search results with the respective metadata; and communicate the augmented search results to the leader role 112 of the observability pipeline system 110.

In some implementations, a search query is generated at the user device 120 based on user input. For instance, the search query may be generated based on search terms entered by a user through a user interface provided by a web browser or other application running on the user device 120. The search query represents a request to search for data that meet specified criteria; for instance, the search query may include search operators that specify target values of parameters. In some examples, a search operator may specify a target value for event type, event time, event origin, event source, system state context, or other parameters. When the user device 120 receives or otherwise obtains search results for the search query, the search results can be displayed to the user. For instance, the search results may be displayed in a user interface provided by a web browser or other application running on the user device 120.

In some implementations, the search query is received by an agent of the observability pipeline system 110 (e.g., leader node running at the user device 120, on a server, in the cloud or elsewhere), and the agent can dispatch the search query to an appropriate resource in the observability pipeline system 110. The agent may dispatch the search query to one or more computer resources, computer systems, or locations associated with the data to be searched. For instance, a search query may be dispatched to a resource, system or location associated with a data source 102, a data destination 104, a data storage 106. Accordingly, the observability pipeline system 110 can perform the search at an endpoint node, on a server, on a cloud-based storage facility, or elsewhere.

In some implementations, a search is performed by configuring and executing an observability pipeline process. For example, an observability pipeline process (e.g., the observability pipeline process 200 shown in FIG. 2) can be configured to perform a search according to a search query. Configuring an observability pipeline process can include selecting, defining or configuring any aspect or feature of the observability pipeline process. For example, configuring the observability pipeline process may include selecting a source that will provide input data for the observability pipeline process, selecting a destination where the output data from the observability pipeline process will be sent, configuring a pipeline engine (e.g., by selecting and applying configuration settings to routes and pipelines) that will process the data. In some examples, the pipelines or aspects of a pipeline engine can include filters that are configured based on the search query. For instance, a pipeline can be configured to select events according to a search operator, for example, events that match a target value for event type, event time, event origin, event source, etc. In some examples, the data source for the observability pipeline process is defined based on the search query. For instance, if a search query specifies a device or application to be searched, the data source for the observability pipeline process can be defined as the specified device or application. In some examples, the data destination for the observability pipeline process is defined based on the search query. For instance, the agent that dispatched the search query can be defined as the data destination for the observability pipeline process.

Figure 2:
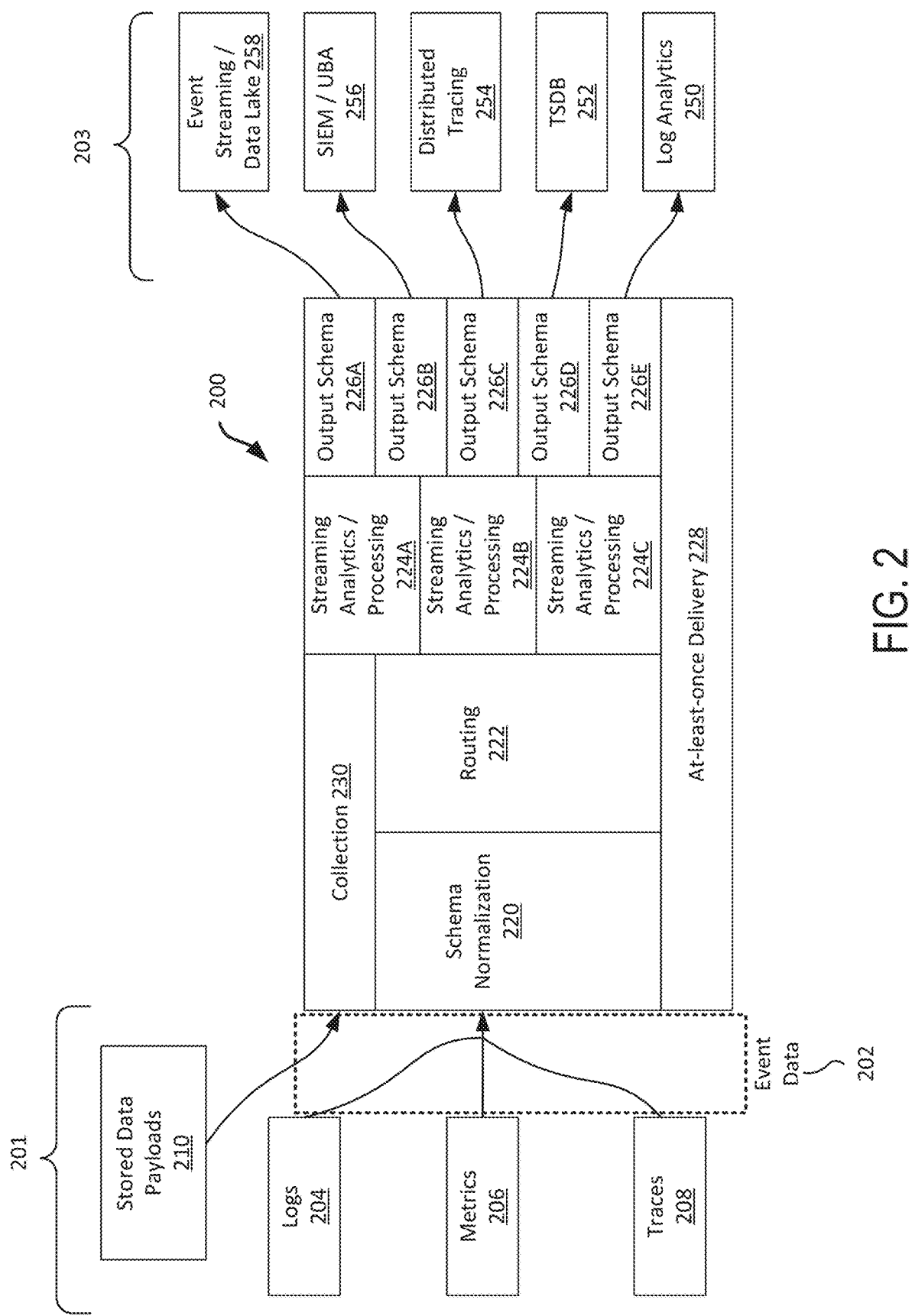
FIG. 2 is a block diagram showing aspects of an example observability pipeline process.

FIG. 2 is a block diagram showing aspects of an example observability pipeline process 200. For example, the observability pipeline process 200 may be performed by one or more of the worker roles 114, the data sources 102, the data storage 106 of the example observability pipeline system 110 shown in FIG. 1, the endpoint node 304 shown in FIG. 3A, the host node 312 in FIG. 3B, or another observability pipeline system. The observability pipeline process 200 can be configured according to a search query received (e.g., from the leader role 112, 302 in FIGS. 1 and 3A-3B) and applied to event data (e.g., by operation of the search engine 308 shown in FIGS. 3A-3B) to perform a search, obtain search results and provenance information, generate augmented search results, and distributing the augmented search results to data destinations.

As shown in FIG. 2, the example observability pipeline process 200 shown in FIG. 2 includes data collection 230, schema normalization 220, routing 222, streaming analytics and processing 224A, 224B, 224C, and output schematization 226A, 226B, 226C, 226D, 226E. The observability pipeline process 200 may include additional or different operations, and the operations of the observability pipeline process 200 may be performed as described with respect to FIG. 2 or in another manner. In some cases, one or more of the operations can be combined, or an operation can be divided into multiple sub-processes. Certain operations may be iterated or repeated, for example, until a terminating condition is reached.

As shown in FIG. 2, the observability pipeline process 200 is applied to pipeline input data 201 from data sources, and the observability pipeline process 200 delivers pipeline output data 203 to data destinations. The data sources can include any of the example data sources 102 or data storage 106 described with respect to FIG. 1, and the data destinations can include any of the example data destinations 104 or data storage 106 described with respect to FIG. 1.

The example pipeline input data 201 shown in FIG. 2 includes logs 204, metrics 206, traces 208, stored data payloads 210, and possibly other types of machine data. In some cases, some or all of the machine data can be generated by agents (e.g., Fluentd, Collectd, OpenTelemetry) that are deployed at the data sources, for example, on various types of computing devices in a computing environment (e.g., in the computing environment 100 shown in FIG. 1, or another type of computing environment). The logs 204, metrics 206, and traces 208 can be decomposed into event data 202 that are consumed by the observability pipeline process 200. In some instances, logs 204 can be converted to metrics 206, metrics 206 can be converted to logs 204, or other types of data conversion may be applied.

In the example shown, the stored data payloads 210 represent event data retrieved from external data storage systems. For instance, the stored data payloads 210 can include event data that an observability pipeline process previously provided as output to the external data storage system.

The event data 202 are provided to the observability pipeline process 200 for processing. As shown in FIG. 2, the event data from the logs 204, metrics 206, and traces 208 can be provided directly to the schema normalization process (at 220) without use of the collection process (at 230), whereas the event data from the stored data payloads 210 can be provided to the collection process (at 230) and then streamed to the schema normalization process (at 220), the routing process (at 222) or the streaming analytics and processing (at 224).

In some instances, event data 202 represents events as structured or typed key value pairs that describe something that occurred at a given point in time. For example, the event data 202 can contain information in a data format that stores key-value pairs for an arbitrary number of fields or dimensions, e.g., in JSON format or another format. A structured event can have a timestamp and a "name" field. Instrumentation libraries can automatically add other relevant data like the request endpoint, the user-agent, or the database query. In some implementations, components of the events data 202 are provided in the smallest unit of observability (e.g., for a given event type or computing environment). For instance, the event data 202 can include data elements that provide insight into the performance of the computing environment 100 to monitor, track, and triage incidents (e.g., to diagnose issues, reduce downtime, or achieve other system objectives in a computing environment).

In some instances, logs 204 represent events serialized to disk, possibly in several different formats. For example, logs 204 can be strings of text having an associated timestamp and written to a file (often referred to as a flat log file). The logs 204 can include unstructured logs or structured logs (e.g., in JSON format). For instance, log analysis platforms store logs as time series events, and the logs 204 can be decomposed into a stream of event data 202.

In some instances, metrics 206 represent summary information about events, e.g., timers or counters. For example, a metric can have a metric name, a metric value, and a low cardinality set of dimensions. In some implementations, metrics 206 can be aggregated sets of events grouped or collected at regular intervals and stored for low cost and fast retrieval. The metrics 206 are not necessarily discrete and instead represent aggregates of data over a given time span. Types of metric aggregation are diverse (e.g., average, total, minimum, maximum, sum-of-squares), but metrics typically have a timestamp (representing a timespan, not a specific time); a name; one or more numeric values representing some specific aggregated value; and a count of how many events are represented in the aggregate.

In some instances, traces 208 represent a series of events with a parent/child relationship. A trace may provide information about an entire user interaction and may be displayed in a Gantt-chart-like view. For instance, a trace can be a visualization of events in a computing environment, showing the calling relationship between parent and child events, as well as timing data for each event. In some implementations, individual events that form a trace are called spans. Each span stores a start time, duration, and an identification of a parent event (e.g., indicated in a parent-id field). Spans without an identification of a parent event are rendered as root spans.

The example pipeline output data 203 shown in FIG. 2 include data formatted for log analytics platforms (250), data formatted for time series databases (TSDBs) (252), data formatted for distributed tracing systems (254), data formatted for security information and event management (SIEM) or user behavior analytics (UBA) systems 256, and data formatted for event streaming systems or data lakes 258 (e.g., a system or repository of data stored in its natural/raw format). Log analytics platforms are configured to operate on logs to generate statistics (e.g., web, streaming, and mail server statistics) graphically. TSDBs operate on metrics; for example, TSDBs include Round Robin Database (RRD), Graphite's Whisper, and OpenTSDB. Tracing systems operate on traces to monitor complex interactions, e.g., interactions in a microservice architecture. SIEMs provide real-time analysis of security alerts generated by applications and network hardware. UBA systems detect insider threats, targeted attacks, and financial fraud. Pipeline output data 203 may be formatted for, and delivered to, other types of data destinations in some cases.

In the example shown in FIG. 2, the observability pipeline process 200 includes a schema normalization module that (at 220) converts the various types of event data 202 to a common schema or representation to execute shared logic across different agents and data types. For example, machine data from various agents such as Splunk, Elastic, Influx, and OpenTelemetry have different opinionated schemas, and the schema normalization module can convert the event data to normalized event data. Machine data intended for different destinations may need to be processed differently. Accordingly, the observability pipeline process 200 includes a routing module that (at 222) routes the normalized event data (e.g., from the schema normalization module 220) to different processing paths depending on the type or content of the event data. The routing module can be implemented by having different streams or topics. The routing module routes the normalized data to respective streaming analytics and processing modules. FIG. 2 shows three streaming analytics and processing modules, each applied to normalized data (at 224A, 224B, 224C); however, any number of streaming analytics and processing modules may be applied. Each of the streaming analytics and processing modules can aggregate, suppress, mask, drop, or reshape the normalized data provided to it by the routing module. The streaming analytics and processing modules can generate structured data from the normalized data provided to it by the routing module. The observability pipeline process 200 includes output schema conversion modules that (at 226A, 226B, 226C, 226D, 226E) schematize the structured data provided by the streaming analytics and processing modules. The structured data may be schematized for one or more of the respective data destinations to produce the pipeline output data 203. For instance, the output schema conversion modules may convert the structured data to a schema or representation that is compatible with a data destination. In some implementations, the observability pipeline process 200 includes an at-least-once delivery module that (at 228) applies delivery semantics that guarantee that a particular message can be delivered one or more times and will not be lost. In some implementations, the observability pipeline process 200 includes an alerting or centralized state module, a management module, or other types of sub-processes.

In the example shown in FIG. 2, the observability pipeline process 200 includes a collection module that (at 230) collects filtered event data from stored data payloads 210. For example, the stored data payloads 210 may represent event data that were previously processed and stored on the event streaming/data lake 258 or event data that were otherwise stored in an external data storage system. For example, some organizations have a high volume of data that is kept in storage systems (e.g., S3, Azure Blob Store, etc.) for warehousing purposes, or they may have event data that can be scraped from a REST endpoint (e.g., Prometheus). The collection module may allow organizations to apply the observability pipeline process 200 to data from storage, REST endpoints, and other systems regardless of whether the data has been processed by an observability pipeline system in the past. The data collection module can retrieve the data from the stored data payload 210 on the external data storage system, stream the data to the observability pipeline process 200 (e.g., via the schema normalization module, the routing module, or a streaming analytics and processing module), and send the output to any of the data destinations 104.

Figure 3A:
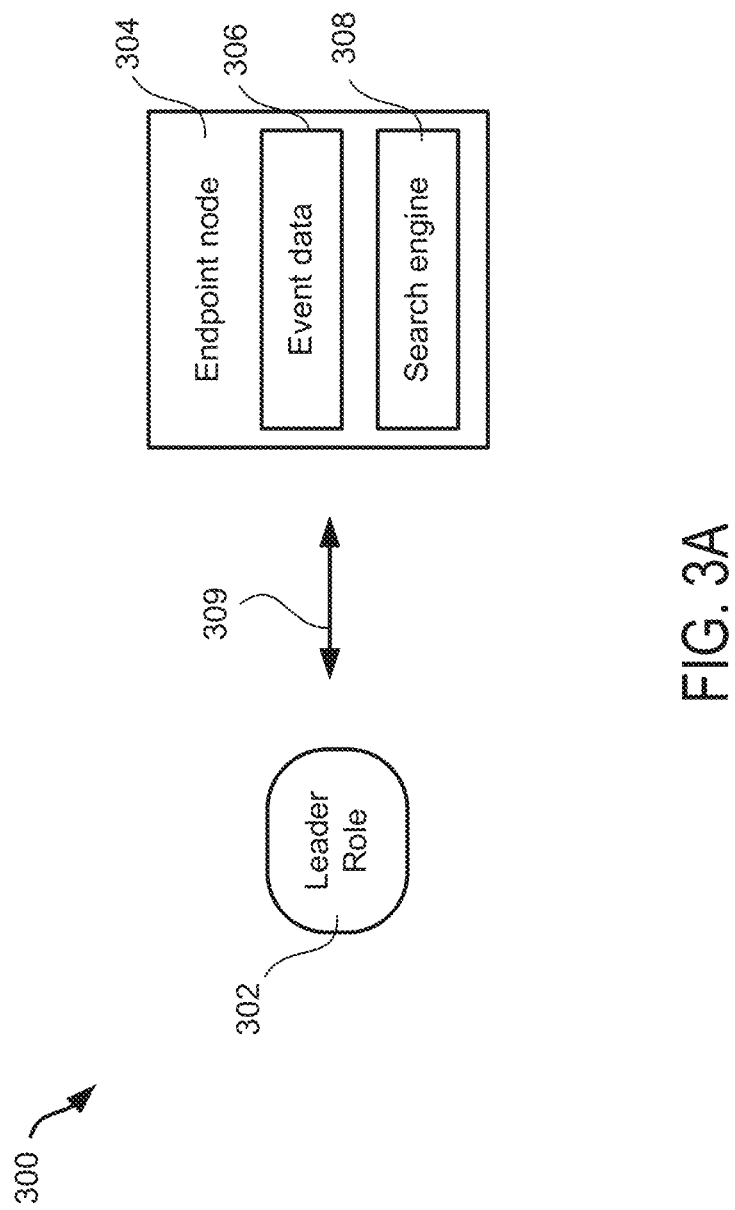
FIGS. 3A-3B are schematic diagrams showing aspects of an example computing environment.

FIG. 3A is a schematic diagram showing aspects of an example computing environment 300. The example computing environment 300 includes a leader role 302 and an endpoint node 304 communicably connected to the leader role 302 through a communication link 309. A search engine 308 of an observability pipeline system operates on the endpoint node 304; and event data 306 is stored at the same endpoint node 304. In some implementations, the endpoint node 304 may be implemented as the data source 102 or another component of the communication environment 100 shown in FIG. 1. The leader role 302 may be implemented as the leader role 112 as shown in FIG. 1, and may be deployed on the user device 120, on a server or another component of the communication environment 100 shown in FIG. 1. The communication link 309 may be implemented as the network 108 in FIG. 1 or in another manner. The computing environment 300 may include additional or different features, and the elements of the computing environment 300 may be configured to operate as described with respect to FIG. 3A or in another manner. For example, the computing environment 300 may include multiple endpoint nodes, data storage, data sources, user devices, or other units which are communicably connected to the leader role 302.

Figure 3B:
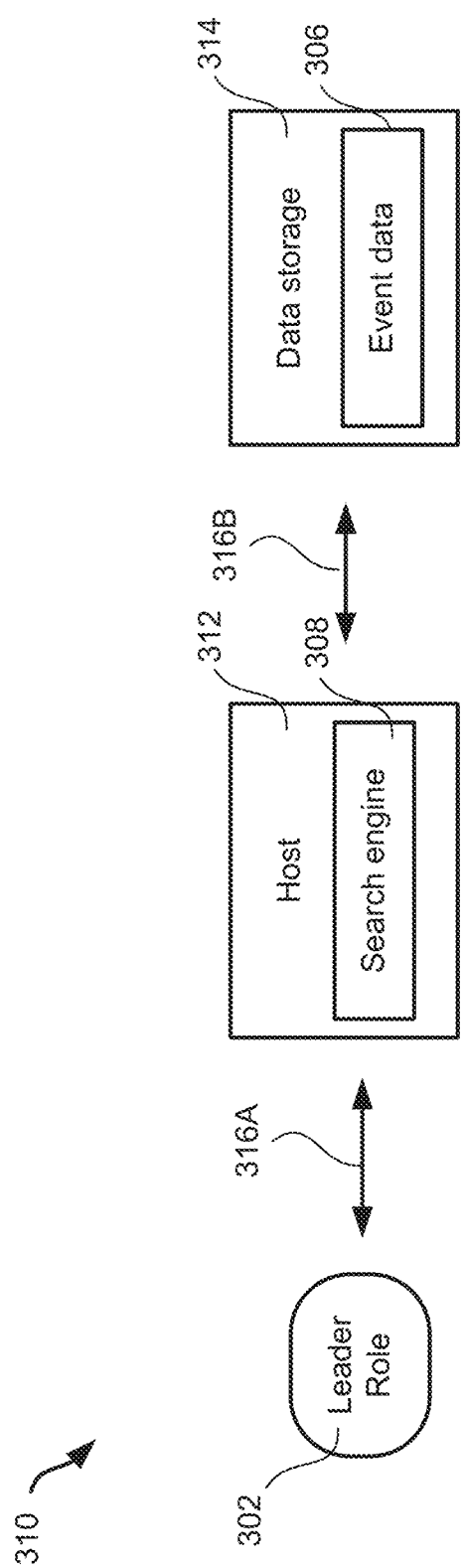

FIG. 3B is a schematic diagram showing aspects of another example computing environment 310. The example computing environment 310 includes the leader role 302, a host node 312, and a data storage node 314, which are communicably connected to one another through respective communication links 316A, 316B. The search engine operates on the host node 312; and the event data 306 is stored on a distinct node, e.g., the data storage node 314. In some implementations, the host node 312 may be implemented as a device associated with the data storage 106 shown in FIG. 1 or in another manner. The leader role 302 may be implemented as the leader role 112 as shown in FIG. 1, and may be deployed on the user device 120, on a server or another component of the communication environment 100 shown in FIG. 1. The data storage node 314 may be implemented as the data storage 106 as shown in FIG. 1 or in another manner. The communication links 316A, 316B may be implemented as the network 108 in FIG. 1 or in another manner. In some instances, the data storage node 314 may be an Amazon S3 bucket, S3-compatible object stores, REST API Endpoints, or other data storage system. The computing environment 310 may include additional or different features, and the elements of the computing environment 310 may be configured to operate as described with respect to FIG. 3B or in another manner. For example, the computing environment 310 may include multiple data storage nodes, endpoint nodes, data sources or other units.

In some implementations, the search engines 308 in FIGS. 3A and 3B, as part of an observability pipeline system, may be deployed as an application or another type of software module running on the endpoint node 304 or the host node 312. In some instances, the search engine 308 is configured to collect, access, and process locally or remotely stored data (e.g., the event data at the endpoint node 304 or the data storage node 314). In some instances, the search engine 308 allows users (e.g., through a user interface at the leader role 302) to specify search parameters for filtering and selecting log files; to specify and optimize data collection parameters for obtaining data from the selected log files; to configure an observability pipeline process; to perform a search process by applying the observability pipeline process on the data; to obtain search results; to obtain provenance information for each event in the search results; to perform pre-processing to the collected data (e.g., augmenting the search results by associating the provenance information with the respective event); and to route the search results to results destinations. In some implementations, the search engine 308 of the endpoint node 304 or the host 312 includes a computing resource for configuring an observability pipeline process, performing a search process by applying the observability pipeline process; augmenting the search results with the provenance information; and performing other functions. The computing resource may include dynamically assigned computing resources, etc.

In some implementations, the endpoint node 304 in FIG. 3A and the data storage node 314 of FIG. 3B includes memory units, or other types of data storage units configured to store the event data 306. The event data 306 stored at the endpoint node 304 may be locally generated at the endpoint node 304; and the event data 306 stored at the data storage node 314 may be remotely produced and received from a distinct node (e.g., the data source 102 in FIG. 1, a distinct endpoint node, etc.). In some implementations, event data 306 stored at the endpoint node 304 or the data storage node 314 includes observability pipeline output data generated by an observability pipeline system (e.g., the observability pipeline system 110 shown in FIG. 1), or pipeline input data (e.g., the pipeline input data 201 shown in FIG. 2). The endpoint node 304 or the data storage node 314 can also provide access to untransformed observability data which is not yet processed by an observability pipeline system. In some instances, the search engine 308 can access memory units at the endpoint node 304 or the host node 312, which can also be configured to store search results, provenance information, augmented search results, or other data.

In some implementations, the data storage node 314 is a cloud-based data storage system. In some instances, the data storage node 314 is a physical server with one or more hard-disk drives (HDDs) or solid-state drives (SDDs). The data storage node 314 can also be a virtual machine or virtual LUN with access to one or more HDDs and/or SSDs. For example, the data storage node 314 may be an AWS server. In some instances, the data storage node 314 does not include computing resources that can be configured as the search engine for performing a search process on the stored event data 306.

In some implementations, a search query is received by the search engine 308 of the observability pipeline system at the endpoint node 304 in FIG. 3A or at the host 312 in FIG. 3B from the leader role 302 via respective transmission links 309, 316A. In some instances, a search query may be created by a user device and received by the leader role 302 from the user device; may be created directly through a user associated with the leader role 302, or in another manner. A search query requests to search the event data 306 at the endpoint node 304 or at the data storage node 314. For example, the leader role 302 identifies the endpoint node 304 at which the search engine 308 and the event data 306 reside according to the search query; and communicates the search query to the search engine 308 of the endpoint node 304 where an observability pipeline process can be configured according to the search query and applied to the event data 306. For another example, the leader role 302 identifies the data storage node 314 according to the search query and identifies the host node 312 associated with the data storage node 314. In this case, the search query can then be communicated from the leader role 302 to the search engine 308 of the host node 312 where an observability pipeline process can be configured according to the search query and applied to the event data 306 at the data storage node 314.

When an observability pipeline process is configured by the search engine 308 according to the received search query, search parameters (e.g., data source, pipelines, routes, results destinations, etc.) of the observability pipeline process can be configured according to the search query such that the event data at the data source can be routed to the pipelines according to the routes; search results including structured output data can be generated from the event data by operation of the pipelines; and the search results can be routed to the result destination.

In some implementations, search results, including a subset of events in the event data 306, are obtained by the search engine 308 when applying the observability pipeline process on the event data 306. In some implementations, the search engine 308 also obtains provenance information associated with respective events in the search results. In some implementations, provenance information includes information of an event and the computer resource where the event is stored, e.g., the endpoint node 304 and the data storage node 314. For example, the provenance information may include an identification of the computer resource that stores a respective event in the search results, and a link to the computer resource for the respective event. In some instances, provenance information may include size of a log file where the event is located, time when the log file is generated, whether or not the log file is encrypted, location and region of the computer resource, and other metadata. In some implementations, provenance information may be obtained by the search engine when the search results are obtained. The search engine 308 is configured to augment the search results, by associating the provenance information with the respective events in the search results. In some instances, the search engine 308 may be configured to perform other pre-processing to the search results prior to transmitting them back to the leader role 302.

In some implementations, the augmented search results include one or more fields, each representing a portion of the provenance information. The provenance information in the augmented search results may allow the user device to initiate a session on the endpoint node 304 or the data storage node 314 by clicking on the one or more fields in the augmented search results. The provenance information that allows the user device to initiate a session on the endpoint node 304 or the host node 312 can include, for example, one or more of a protocol credential, a schema to read a file, a compression encoding, or permissions. For example, a schema includes a structure that describes the expected format of a file, including the types of data, the order of fields, and any constraints on the data. When reading a file with a schema, a program can use the schema to validate the data and ensure that it conforms to the expected format. For another example, information about a compression coding that is used to reduce the size of the log file can be also included in the provenance information obtained by the endpoint node 304 or the host node 312. In some instances, the provenance information, e.g., the schema, the compression coding, permission, etc., can be inferred by or otherwise obtained from, for example, by the respective log file where the event data is generated.

In some implementations, the augmented search results are communicated back to the leader role 302 from the endpoint node 304 or the host node 312. In some implementations, the augmented search results can be further enriched by the leader role 302 prior to being displayed on the user interface. For example, the leader role may add authentication, credential, security token, or other necessary login information to the link of the provenance information.

In some instances, a search engine 308 may be configured at the data storage node 314. For example, a dynamic computing resource can be deployed at the data storage node 314 to receive the search query, which can be operated as a search engine to configure the observability pipeline process according to the search query, to perform the search process by applying the observability pipeline process on the event data. The observability pipeline process can generate the search results which include events; obtain provenance information; and augment the search results with the provenance information. In some instances, the dynamic computing resource at the data storage node 314 may include Lambdas, on-demand containers, region-specific pre-warmed resources, or other types of computing resources.

In some implementations, the host node 312 that includes the search engine 308 which are available and addressable by the leader role 302 can be identified, for example, according to their availability or other parameters. For example, the host node 312 may be a worker role that is generally available as "public addressable compute resources", for example as published by public cloud providers; can be dedicated, private processing resources that need to be registered to the leader role to be usable, or in another manner. In some implementations, the host node 312 executes the search query or parts of the search query received from the leader role 302 to perform a search process on the event data 306 at the data storage node 314. In some implementations, the host node 312 is configured to generate the search results based on performing a remote read of the event data 306 stored at the data storage node 314. When a remote read is performed, the host node 312 sends a remote read command to the data storage node 314; and in response, receives data from the data storage node 314; the host node 312 can then locally search and process (for example, filter, project, transform, etc.) the data received from the data storage node 314. In some instances, the host node 312 can be configured to generate the search results based on the search query in another manner. In some implementations, the host node 312 also obtains provenance information for each of the events in the search results from the data storage node 314. The search results can then be augmented with the provenance information, by associating the provenance information with the respective events in the search results.

Figure 4:
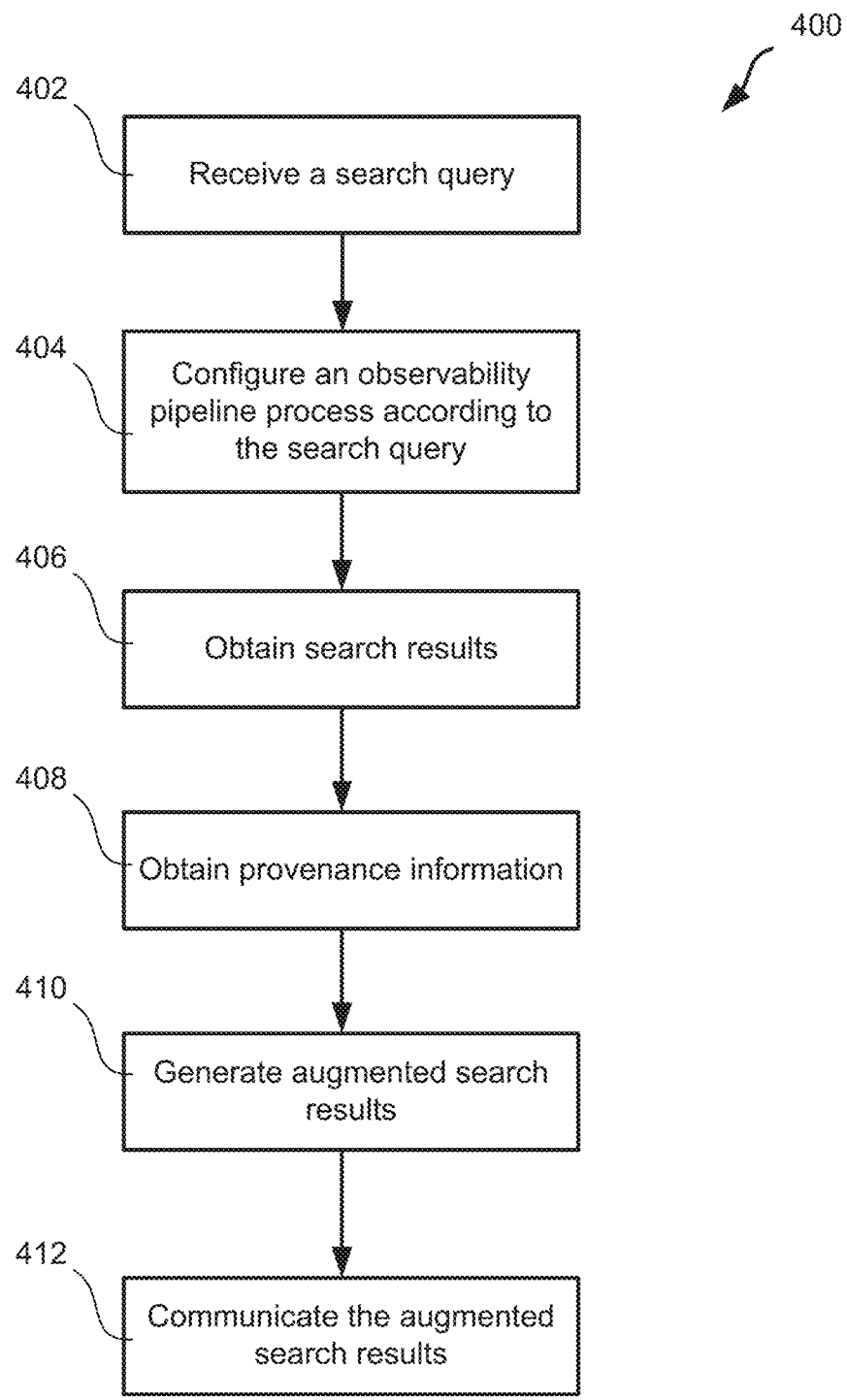
FIG. 4 is a flow chart showing aspects of an example search process.

FIG. 4 is a flow chart showing aspects of an example process 400. In some implementations, the operations of the example process 400 are performed by operation of a node which includes a search engine that can be configured to apply an observability pipeline process to perform the example process 400. For example, the node may be implemented as the data source 102, the data storage 106, a worker role 114, or other nodes of the observability pipeline system 110 shown in FIG. 1. For another example, the example process 400 may be performed by the endpoint node 304 in FIG. 3A or the host node 312 in FIG. 3B. The example process 400 may include additional or different operations, including operations performed by additional or different components, and the operations may be performed in the order shown or in another order.

The example process 400 shown in FIG. 4 can be used to configure an observability pipeline process (e.g., the example observability pipeline process 200 shown in FIG. 2) according to a search query; apply the observability pipeline process to search the event data stored on the same node or a distinct node; obtain provenance information associated with search results; and generate augmented search results by associating the provenance information with respective events in the search results. Such deployment can keep data-heavy operations close to the data stored at the data sources, data destinations or data storage nodes, allowing data to remain distributed, thus reducing cost and latency on data transportation. The example process 400 may provide additional advantages and improvements in some cases.

At 402, a search query is received. In some implementations, the search query is received by the node from a leader role of an observability pipeline system (e.g., the leader role 302 in FIGS. 3A, 3B). The node includes a search engine that can configure an observability pipeline process and apply the observability pipeline process to perform a search. In some instances, the search query may be received by the leader role 302 remotely from the user device via the network (e.g., through a browser) or locally configured via a user interface (e.g., that includes a query box where a search query to run can be entered). In some instances, the search query is communicated from the leader role 112 to the node via a communication link (e.g., the communication link 309, 316A in FIGS. 3A-3B). In some implementations, the search engine may be implemented as the search engines 308 in FIGS. 3A-3B or in another manner.

In some implementations, the search query includes an identification of data sources (e.g., bucket name, object-store prefix, access permissions, etc.) specifying event data to be search; functions and search operators that specify one or more search criteria (e.g., filters, functions, search operators, etc.); an identification of a data destination specifying where search results are distributed; and other information. Event data flows from the data source to the data destination via the functions and search operators in the search query; and the event data is filtered or shaped at each search operator or function, and then fed into the subsequent search operator or function. Because the piping of information from one search operator to another can be sequential, the order of the search operators in the search query can be important and can affect both search results and search performance. In some implementations, the order of the search operators in the search query can be adjusted automatically to optimize the overall search performance without influencing the search results. In some implementations, the search query requests information about event data at a computer resource (e.g., produced and stored at the endpoint node 304 in FIG. 3A, stored at the data storage node 314 in FIG. 3B, or another type of data storage). In some implementations, the leader role identifies the computer resource based on the search query. In some instances, the computer resource may include servers, databases, host services, a local or remote file system location, a network file system, Amazon S3 buckets, S3-compatible stores, or other data storage systems.

In some implementations, the event data includes observability pipeline output data generated by the observability pipeline process (e.g., the example pipeline output data 203 shown in FIG. 2). In other implementations, the event data may be raw machine data and yet unprocessed observability data or a combination of these.

In certain instances, the search query may request information about data stored at multiple computer resources (e.g., multiple distinct data storage nodes or multiple distinct endpoint nodes residing at different geolocations). In this case, the multiple computer resources may be identified by the leader role according to the search query.

At 404, an observability pipeline process is configured to perform a search according to the search query. The observability pipeline process includes pipelines and routes. When the observability pipeline process is configured, the routes and pipelines are configured according to the search query. In some implementations, the observability pipeline process includes one or more data sources and one or more data destinations. When the observability pipeline process is configured, the data sources and data destinations may also be determined according to the search query. The data sources can include any of the example data sources 102 or data storage 106 described with respect to FIG. 1; and the data destinations can include any of the example data destinations 104, the data storage 106, the user devices 120 described with respect to FIG. 1. For example, when a search query is received by the search engine 308 at the endpoint node 304 or the host node 312, an observability pipeline process is configured, by operation of the search engine 308. For example, search operators, functions, and their target values in pipelines and routes of the observability pipeline process are configured according to the search query.

In some instances, in response to the search query requesting a search of event data stored at multiple computer resources, multiple dynamic computing resources at respective data storage nodes, or multiple host nodes associated with the respective data storage nodes may be configured and initiated; and respective observability pipeline processes may also be configured by the respective dynamic computing resources or respective host nodes to perform searches at the respective computer resources according to the search query.

At 406, search results are obtained. In some implementations, search results are obtained by applying the observability pipeline process that was configured at 404 according to the search query. In some implementations, the node is configured to generate the search results by scanning and processing the event data based on the observability pipeline process, e.g., filtering, aggregating, enhancing, and other processing operations. The search results may include a subset or representation of a subset of the event data (e.g., events) from the event data. In some implementations, multiple sets of search results may be obtained from the multiple respective computer resources by applying the respective observability pipeline processes to the respective event data on the respective computer resources. In some instances, multiple sets of search results may be obtained in different manners.

At 408, provenance information is obtained. In some implementations, the provenance information is obtained by applying the observability pipeline process that was configured at 404 according to the search query. In some implementations, provenance information for each event in the search results is obtained from the computer resource (e.g., the endpoint node 304 in FIG. 3A, the data storage node 314 in FIG. 3B, etc.). In some implementations, provenance information includes information of an event and the computer resource where the event is stored, e.g., the endpoint node 304 and the data storage node 314. For example, the provenance information includes an identification of the computer resource that stores a respective event in the search results, and a link to the computer resource for the respective event. In some instances, provenance information may include size of a log file where the event is located, time when the log file is generated, whether or not the log file is encrypted, location and region of the computer resource, and other metadata. In some implementations, provenance information may be obtained by the node from the computer resource when the search results are obtained.

At 410, augmented search results are determined. In some implementations, the augmented search results are determined as part of the observability pipeline process that was configured at 404 according to the search query. In some implementations, the augmented search result is generated by associating the provenance information with the respective events by operation of the node. For example, the augmented search results include one or more newly included fields. Each field includes a portion of the provenance information of the computer resource where a respective event is stored.

For instance, if search results return multiple events, fields may be added to each of the events to specify information of the origin system (e.g., where a respective event data is stored). These fields will contain enough metadata (either hidden or visible) to allow the node to construct a linkage/tunnel to access the computer resource (e.g., the endpoint node 304 in FIG. 3A and the data storage node 314 in FIG. 3B) so that users can see the events in context. An example augmented event in a search result is given below:

myField":"this is a sample line in the log file",
"origin_host":"my.hostexample.com",
"origin_path":"/path/to/file.log",
"origin_process_id" 420, In this example, "origin_host" and "origin_path" are fields that are tacked on to the event, where the "origin_host" indicates the address of the data storage node; and "origin_path" indicates the path to the log file on the data storage node. In some instances, such information tacked onto the event in the augmented search results may not be part of the data that is searched (e.g., they are not part of the file.log). In some instances, such information may be tracked in the background.

In some instances, search results can be automatically augmented with provenance information; and the system, can optionally be configured to carry that provenance information forward, e.g., with the search results, to allow users to session into the host that meets the search criteria. For example, when a user wanted to compute "max(cpu_util) by region" across an entire computer infrastructure, a search result may be represented by a table with two columns, e.g., a max(cpu_util) value and a respective region. When the user needs to access information such as hosts/computers/nodes contributed to that max(cpu_util) value for the respective region, provenance information about the hosts/computers/nodes can be added to the search result. In some instances, the search result may be augmented in another manner.

At 412, the augmented search results are communicated to the leader role. In some implementations, the augmented search results are communicated as part of the observability pipeline process that was configured at 404 according to the search query. In some instances, the augmented search results can be displayed to the user via the user interface on the leader role. In some instances, the leader role may add information to the augmented search results that enables the user to access the computer resource. For example, the leader role may add authentication, credential, security token, or other necessary login information to the link of the provenance information. In some implementations, the user can access the computer resource associated with the event in the search results through by clicking on the fields representing the provenance information. In some instances, when the user clicks on the underlined fields in the augmented search results containing the link, a communication session can be initiated between the user and the computer resource and opened to my.host.example.com; the user will be able to see the contents and details of/path/to/file.log. In response to multiple sets of augmented search results being obtained, the received multiple sets of augmented search results may be post-processed (e.g., aggregated or merged) at the leader role before being presented to the user device or routed to other results destinations.

Figure 5:
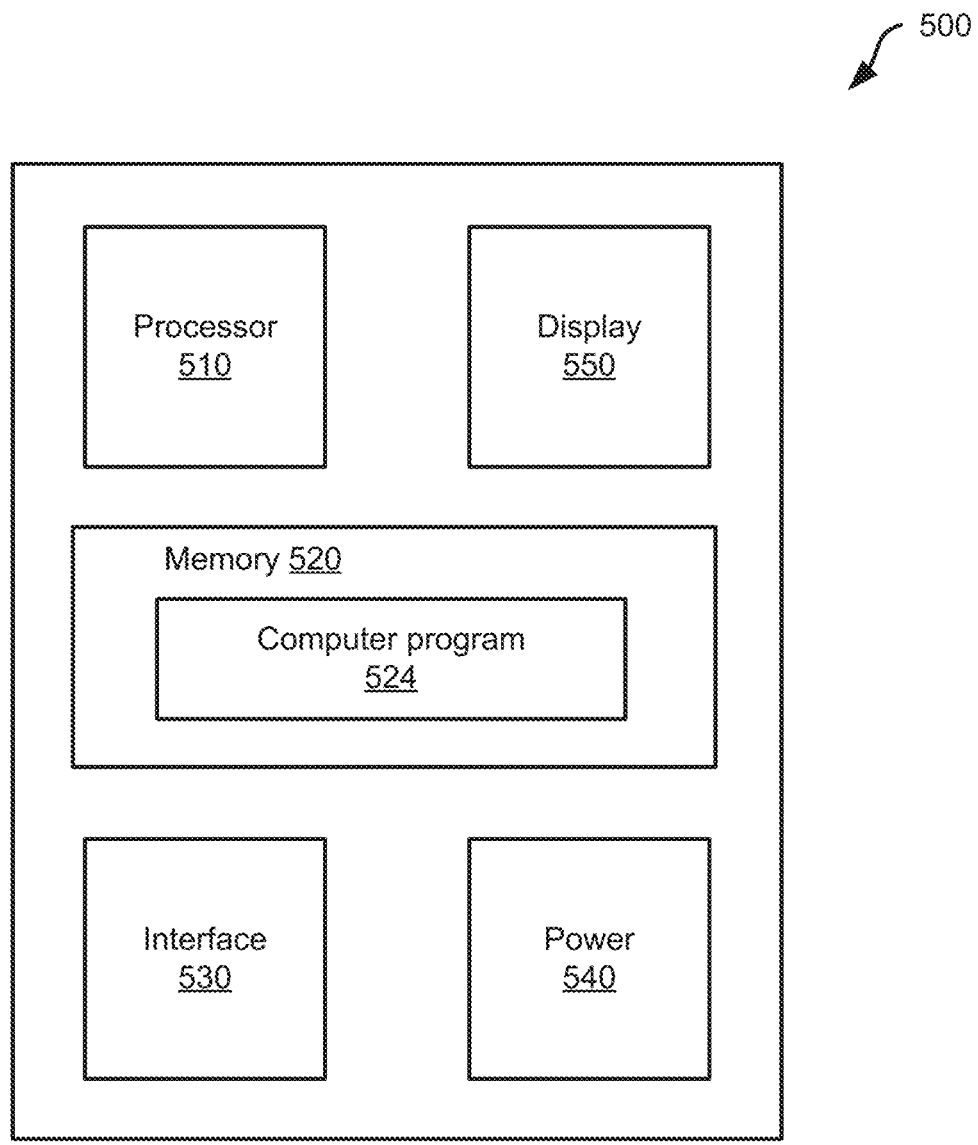
FIG. 5 is a block diagram showing an example computer system.

FIG. 5 is a block diagram showing an example computer system 500 that includes a data processing apparatus and one or more computer-readable storage devices. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 510. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some implementations, the example computer system 500 may be implemented as computer nodes at the leader role 302, the endpoint node 304, and the host node 312 in the computing environments 300, 310 in FIGS. 3A-3B.

A computer program (also known as a program, software, software application, script, or code), e.g., computer program 524, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 510, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 520. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 540 provides power to the other components of the computer system 500. For example, the other components may operate based on electrical power provided by the power unit 540 through a voltage bus or other connection. In some implementations, the power unit 540 includes a battery or a battery system, for example, a rechargeable battery. In some implementations, the power unit 540 includes an adapter (e.g., an AC adapter) that receives an external power signal (from an external source) and converts the external power signal to an internal power signal conditioned for a component of the computer system 500. The power unit 540 may include other components or operate in another manner.

To provide for interaction with a user, operations can be implemented on a computer having a display device, e.g., display 550, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser, or by sending data to an application on a user's client device in response to requests received from the application.

The computer system 500 may include a single computing device or multiple computers that operate in proximity or generally remote from each other and typically interact through a communication network, e.g., via interface 530. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship with each other.

The example interface 530 may provide communication with other systems or devices. In some cases, the interface 530 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 530 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect of what is described, search results are automatically enriched with provenance information in an observability pipeline system.

In a first example, a search method includes receiving a search query from a leader role in an observability pipeline system, the search query representing a request to search event data at a computer resource; configuring an observability pipeline process to perform a search according to the search query; obtaining search results based on applying the observability pipeline process to the event data, the search results comprising a plurality of events from the event data; obtaining provenance information for each of the plurality of events, the provenance information for each event includes, an identification of the computer resource, and a link to the computer resource; generating augmented search results by associating the provenance information with the respective events; and communicating the augmented search results to the leader role.

Implementations of the first example may include one or more of the following features. The computer resource is an endpoint node, and the endpoint node includes search engine that: configures the observability pipeline process to perform the search according to the search query; and applies the observability pipeline process to the event data. The computer resource is a cloud-based data storage system, and a host node associated with the cloud-based data storage system includes a search engine that: receives the event data from the cloud-based data storage system; configures the observability pipeline process to perform the search according to the search query; and applies the observability pipeline process to the event data.

Implementations of the first example may include one or more of the following features. The observability pipeline process defines pipelines, routes, and data sources, and applying the observability pipeline process to the event data includes routing the event data from the one or more data sources to the pipelines according to the routes; and generating structured output data from the event data by operation of the pipelines. Configuring the observability pipeline process includes defining the one or more data sources, the routes, and the pipelines according to the search query. The observability pipeline process defines at least one data destination, and communicating the augmented search results to the leader role includes distributing the structured output data to the at least one data destination.

Implementations of the first example may include one or more of the following features. A user device submits the search query to the leader role, the leader role sends the augmented search results to the user device, and the provenance information allows the user device to initiate a session on the computer resource. The provenance information that allows the user device to initiate a session on the computer resource includes one or more of a protocol credential, a schema to read a file, a compression encoding, or permissions. The method includes applying the observability pipeline process to the event data, wherein applying the observability pipeline process includes obtaining the provenance information; generating the augmented search results, and communicating the augmented search results to the leader role. Generating the augmented search results includes adding one or more fields to the plurality of events; and each field includes a respective portion of the provenance information.

In a second example, an observability pipeline system includes a computer node; the computer node includes a search engine configured to perform one or more operations of the first example.

In a third example, a non-transitory computer-readable medium comprises instructions that are operable when executed by data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A search method comprising:
   receiving a search query from a leader role in an observability pipeline system, the search query representing a request to search event data at a computer resource;
   configuring an observability pipeline process to perform a search according to the search query;
   obtaining search results based on applying the observability pipeline process to the event data, the search results comprising a plurality of events from the event data;
   obtaining provenance information for each of the plurality of events, the provenance information for each event comprising:
     an identification of the computer resource, and
     a link to the computer resource;
   generating augmented search results by associating the provenance information with the respective events; and
   communicating the augmented search results to the leader role.

2. The method of claim 1, wherein the computer resource is an endpoint node, and the endpoint node comprises a search engine that:
   configures the observability pipeline process to perform the search according to the search query; and
   applies the observability pipeline process to the event data.

3. The method of claim 1, wherein the computer resource is a cloud-based data storage system, and a host node associated with the cloud-based data storage system comprises a search engine that:
   receives the event data from the cloud-based data storage system;
   configures the observability pipeline process to perform the search according to the search query; and
   applies the observability pipeline process to the event data.

4. The method of claim 1, wherein the observability pipeline process defines pipelines, routes, and one or more data sources, and applying the observability pipeline process to the event data comprises:
   routing the event data from the one or more data sources to the pipelines according to the routes; and
   generating structured output data from the event data by operation of the pipelines.

5. The method of claim 4, wherein configuring the observability pipeline process comprises defining the one or more data sources, the routes, and the pipelines according to the search query.

6. The method of claim 4, wherein the observability pipeline process defines at least one data destination, and communicating the augmented search results to the leader role comprises distributing the structured output data to the at least one data destination.

7. The method of claim 1, wherein a user device submits the search query to the leader role, the leader role sends the augmented search results to the user device, and the provenance information allows the user device to initiate a session on the computer resource.

8. The method of claim 7, wherein the provenance information that allows the user device to initiate a session on the computer resource comprises one or more of a protocol credential, a schema to read a file, a compression encoding, or permissions.

9. The method of claim 1, comprising applying the observability pipeline process to the event data, wherein applying the observability pipeline process comprises:
   obtaining the provenance information;
   generating the augmented search results, wherein generating the augmented search results comprises adding one or more fields to the plurality of events, and each field comprises a respective portion of the provenance information; and
   communicating the augmented search results to the leader role.

10. A computer node comprising a search engine configured to perform operations comprising:
    receiving a search query from a leader role in an observability pipeline system, the search query representing a request to search event data at a computer resource;
    configuring an observability pipeline process to perform a search according to the search query;
    obtaining search results based on applying the observability pipeline process to the event data, the search results comprising a plurality of events from the event data;
    obtaining provenance information for each of the plurality of events, the provenance information for each event comprising:
      an identification of the computer resource, and
      a link to the computer resource;
    generating augmented search results by associating the provenance information with the respective events; and
    communicating the augmented search results to the leader role.

11. The computer node of claim 10, wherein the computer node comprising the search engine is an endpoint node that includes the computer resource.

12. The computer node of claim 10, wherein the computer resource is a cloud-based data storage system, the computer node comprising the search engine is a host node associated with the cloud-based data storage system.

13. The computer node of claim 10, wherein the observability pipeline process defines pipelines and routes, and applying the observability pipeline process to the event data comprises:
routing the event data to the pipelines according to the routes; and
generating structured output data from the event data by operation of the pipelines.

14. The computer node of claim 13, wherein configuring the observability pipeline process comprises defining the routes and pipelines according to the search query.

15. The computer node of claim 10, wherein a user device submits the search query to the leader role, the leader role sends the augmented search results to the user device, and the provenance information allows the user device to initiate a session on the computer resource.

16. The computer node of claim 15, wherein the provenance information that allows the user device to initiate a session on the computer resource comprises one or more of a protocol credential, a schema to read a file, a compression encoding, or permissions.

17. The computer node of claim 10, wherein generating the augmented search results comprises adding one or more fields to the plurality of events, and each field comprises a respective portion of the provenance information.

18. A non-transitory computer-readable medium storing instructions that are operable when executed by data processing apparatus to perform operations comprising:
receiving a search query from a leader role in an observability pipeline system, the search query representing a request to search event data at a computer resource;
configuring an observability pipeline process to perform a search according to the search query;
obtaining search results based on applying the observability pipeline process to the event data, the search results comprising a plurality of events from the event data;
obtaining provenance information for each of the plurality of events, the provenance information for each event comprising:
an identification of the computer resource, and
a link to the computer resource;
generating augmented search results by associating the provenance information with the respective events; and
communicating the augmented search results to the leader role.

19. The non-transitory computer-readable medium of claim 18, wherein the computer resource is an endpoint node, and the endpoint node comprises a search engine that:
configures the observability pipeline process to perform the search according to the search query; and
applies the observability pipeline process to the event data.

20. The non-transitory computer-readable medium of claim 18, wherein the computer resource is a cloud-based data storage system, and a host node associated with the cloud-based data storage system comprises a search engine that:
receives the event data from the cloud-based data storage system;
configures the observability pipeline process to perform the search according to the search query; and
applies the observability pipeline process to the event data.

* * * * *